Patented May 28, 1940

2,202,553

UNITED STATES PATENT OFFICE 2,202,553

ELECTRICALLY DRIVEN VARIABLE SPEED DRIVE SYSTEM

Don Heyer, Los Angeles, Calif., assignor to U. S. Electrical Motors, Inc., Los Angeles, Calif., a corporation of California Application June 24, 1935, Serial No. 28,158

6 Claims. (Cl. 74—230.17)

This invention relates to an adjustable speed drive and more particularly to an integral construction incorporating a geared electric motor in driving relation to a driving pulley structure, a driven pulley structure in driving relation to a driven load and a belt for transmitting power from the driving pulley structure to the driven pulley structure, at least one of the pulley structures having an adjustable effective pulley diameter whereby the variation of speed ratio is obtained.

Such an adjustable pulley structure may include a pair of pulley sections having opposed inclined faces forming a seat for a wedge-shaped driving belt. In order to provide means for adjusting the effective diameter of the pulley structure, the pulley sections are made relatively axially adjustable. In this way the inclined faces can be brought closer together causing the belt to be urged radially outward to produce an increased effective diameter; or they can be separated causing the belt to contact with the inclined faces at a shorter radial distance to produce a decreased effective diameter. In the particular form of the device to be described hereinafter the adjustable speed drive has one pulley structure having an adjustable effective pulley diameter and one pulley structure, which may have a fixed effective diameter. The belt or power transmitting member employed has a substantially constant effective length. This gives rise to the problem of adjusting a belt of constant length to pulleys of relatively variable effective diameter. When only one adjustable diameter pulley structure is employed the belt may be maintained in active driving relation to the pulley structures by adjusting the center distance between the axes of the two pulley structures simultaneously with the adjustment of the adjustable diameter pulley structure. Thus in construction employing one adjustable diameter pulley structure and in which the center distance is variable, it is necessary to provide means whereby the center distance and the diameter of the adjustable pulley structure may be adjusted at the relative rates required by the pulley diameters and the belt length.

Such variable speed drives have been described in several earlier applications which can be identified as follows:

Don Heyer, Centrifugally controlled variable speed transmission, Serial No. 631,067, filed August 30, 1932;

Don Heyer, Variable speed transmission device, Serial No. 678,734, filed July 1, 1933;

Don Heyer, Adjustable speed drive, Serial No. 732,452, filed June 26, 1934;

Don Heyer, Multiple belt variable speed drive system, Serial No. 752,657, filed November 12, 1934; and Don Heyer, Multiple belt adjustable speed drive system, Serial No. 16,340, filed April 15, 1935.

This application is a continuation in part of these prior applications.

In one embodiment of the invention to be described hereinafter, this problem is solved by providing positive means for adjusting the effective diameter of the adjustable pulley structure and by providing yielding means for adjusting the center distance between the axes of the two pulley structures in accordance with the adjustment of the adjustable diameter pulley structure. In another form of the adjustable speed drive, positive means are provided for adjusting the center distance between the axes of the two pulley structures and resilient means are provided for adjusting the effective diameter of the adjustable pulley structure in accordance with the adjustment of the center distance between the two pulley structures. In a third form of the adjustable speed drive, interlocking means are provided for adjusting the center distance between the axes of the two pulley structures and for adjusting the effective diameter of the adjustable pulley structure in accordance with the adjustment of the center distance.

In many variable speed power applications the speed required at the load driving shaft is much less than that provided at the driving shaft of the motor. This reduction in speed may be obtained by employing reduction gearing between the driving pulley of the adjustable speed drive and the driven machine; or the driven pulley structure of the adjustable speed drive may be mounted directly on the driving shaft of the driven machine and the reduction in speed may be obtained by the use of appropriate diameters for the driving and driven pulleys. In this invention, one of the pulley structures may be mounted directly on the load driving shaft, which is in active driving relation to the driven load. If the driving pulley structure is mounted directly on the shaft of the driving motor, the diameter of the driven pulley structure is directly determined by the diameter of the driving pulley structure and the reduction in speed which is required between the driving motor and the load driving shaft. Thus where a large reduction in speed is required, the diameter of the driven pulley structure is much greater than that of the driving pulley structure. If it is attempted to obtain the required reduction of speed between the driving electric motor and the driven load by employing reduction gearing between the driven pulley of the adjustable speed drive and the driving shaft of the driven machine, then it is no longer possible to employ the simple construction in which the driven pulley structure is mounted directly on the driving shaft of the driven machine. Or if the reduction in speed is obtained by the use of driving and driven pulleys of the required diameters the construction requires a driven pulley having an exceedingly large diameter, which is expensive to construct and which requires a belt of special length. For it is obvious that for each diameter of the driven pulley structure a belt of different length will be required. It is one of the objects of this invention to provide an adjustable speed drive in which the center distance between the driving and driven pulley structures is variable and in which the required speed may be obtained at the load driving shaft without the necessity of employing belts of special lengths or pulleys of special diameters.

It is still another object of this invention to provide an adjustable speed drive in which the driving pulley structure may be directly supported by the frame of the driving motor and the driven pulley structure may be directly mounted on the driving shaft of a driven machine and in which the required speed is provided at the driving shaft of the driven machine by the use of appropriate gearing between the driving shaft of the electric motor and the driving shaft of the driving pulley structure.

In this invention the required speed is provided at the load driving shaft of the driven machine without the use of belts of special length or pulleys of special diameters by providing appropriate gearing between the driving shaft of the driving electric motor and the driving pulley structure. This construction not only obviates the difficulty of obtaining the required speed at the driving shaft of the driven machine; but also provides means whereby belts having an increased power capacity may be employed. The power which can be transmitted by a belt is determined by the useful belt tension and the peripheral velocity at which the belt may be operated. The peripheral velocity at which the belt may be operated is in turn a function of the effective pulley diameter; for the belt will fail if it is bent over a small diameter even though it is operated at a low peripheral velocity, as the excessive strain and shear produced in the belt quickly separates the belt structure. The belt will also fail if it is bent over a large effective diameter and operated at a high peripheral speed; for although the stress produced in the belt by the distortion of the belt material may be small, this stress is imposed with such a high frequency that the belt soon fails from fatigue. By the use of appropriate gearing between the driving shaft of the electric motor and the driving pulley structure it is possible to operate the electric motor at its optimum speed and to operate the belt at the optimum corresponding values of the peripheral speed and effective pulley diameter.

It is accordingly still another object of this invention to provide an adjustable speed drive having a variable center distance and in which the driving electric motor and the power transmitting means may be operated at their optimum speeds.

This invention possesses many other advantages and has other objects which may be made more easily apparent from a consideration of several embodiments of the invention. For this purpose there are shown several forms in the drawings accompanying and forming a part of the present specification. These forms will now be described in detail which illustrate the general principles of the invention; but it is to be understood that this detailed description is not to be taken in a limiting sense since the scope of the invention is best defined by the appended claims. Referring to the drawings:

Figures 1, 2, 3:
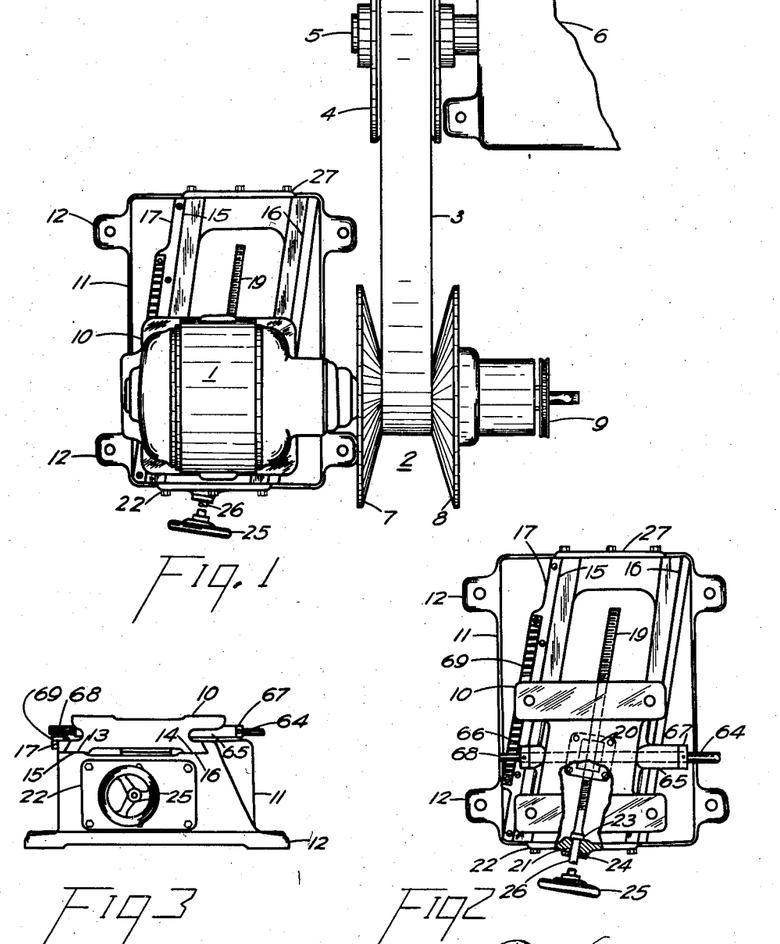
Figure 1 is a plan view of an adjustable speed drive embodying the invention. This view illustrates a form of the adjustable speed drive in which interlocking means are provided for simultaneously adjusting the center distance between the driving and driven pulley structures and for adjusting the effective diameter of the adjustable pulley structure.
Figure 2 is a plan view of the motor supporting structure of Figure 1 with the driving motor removed.
Figure 3 is a side elevation of the motor supporting structure of Figure 1, taken from the front of Figure 1.

Referring to Figure 1, the adjustable speed drive is formed by the geared electric motor 1, which is in driving relation to the adjustable pulley structure 2, mounted on the load driving shaft of the geared electric motor and which by means of the belt 3 drives the pulley structure 4, mounted on the driving shaft 5 of the driven machine 6. The belt 3 is wedge-shaped and has opposed inclined pulley engaging side surfaces. To provide a belt having increased traction, a belt of rubber and fabric composition may be employed. The driven pulley 4 may be a V-type pulley of the type commonly employed in constant speed V-belt drives; however, the width of the groove for the belt must be determined from the dimensions of the adjustable diameter pulley 2. The driving pulley structure 2 is formed by the pulley sections 7 and 8, which have opposed inclined belt engaging faces, forming by relative axial adjustment variable effective pulley diameters. For instance, if it is desired to increase the effective diameter of the adjustable pulley structure, the pulley sections 7 and 8 are moved toward the driving belt 3. This movement of the pulley sections toward each other forces the driving belt radially outward to define a larger effective diameter. Conversely, a separating movement of the pulley sections allows the belt to move radially inward to define a smaller effective diameter. The pulley section 7 is axially fixed to the supporting shaft of the adjustable pulley structure and the pulley section 8 is adjusted axially with respect to the fixed pulley section 7. The axial adjustment of the pulley section 8 is actuated by the rotation of the sprocket wheel 9, which is rotatably supported coaxial with the pulley structure. The means whereby the rotation of the sprocket wheel 9 adjusts the axial position of the pulley section 8 will be described in detail in connection with Figure 4.

It is obvious from the construction that as the diameter of the adjustable pulley structure is increased, that the driving and driven pulleys must be moved toward each other to provide the center distance required by the belt length. Conversely, when the diameter of the adjustable pulley structure is decreased the center distance between the pulley structures must be increased to adjust the belt to the decreased pulley diameter. In the present instance the center distance between the driving and driven pulley structures is positively adjusted and the diameter of the adjustable pulley structure is interlockingly adjusted to the diameter required by the adjusted center distance.

To provide means for adjusting the center distance between the pulley structures, the geared electric motor 1 is mounted on the sliding motor base 10, which in turn is supported by the sub-base 11. The sub-base 11 is provided with appropriate feet 12 for securing the motor supporting structure to the supporting foundation. It is obvious from the construction that if the belt is to be maintained in alignment that, the opposite facing pulley sections must be moved by substantially equal increments toward or away from the driving belt. Thus when the diameter of the adjustable pulley structure is increased, pulley section 7 must be moved toward the right, to approach the driving belt 3, and the pulley section 8 must be moved a substantially equal distance toward the left, as viewed in Figure 1. The pulley section 7 is, however, axially fixed with respect to the frame of the electric motor 1. Thus as the diameter of the adjustable pulley structure is increased, pulley section 7, together with the geared electric motor 1, must be moved toward the right and simultaneously with this movement, the geared electric motor 1 must be moved toward the driven pulley 4 to adjust the center distance to the value required by the increased pulley diameter.

In the present instance the required movement of the geared electric motor and of the adjustable pulley structure is provided by means of an angular guide, which moves the sliding base 10 and the supported motor in an axial direction simultaneously with the adjustment of the center distance. This guide is formed by the engagement of the tongue members 13 and 14, Figure 3, formed on the sliding base, with the grooves 15 and 16 formed on the sub-base. The grooves 15 and 16 are formed at the required angle with respect to the axis of the adjustable pulley structure so that, the pulley section 7 is adjusted in an axial direction at the rate required to maintain the belt in substantial alignment. Thus as viewed in Figure 1, when the center distance between the driving and driven pulleys is decreased the grooves 15 and 16 move the supported motor and the pulley section 7 toward the driving belt to maintain the belt in alignment. The required angle at which the grooves 15 and 16 should be formed, to maintain the belt in perfect alignment, will vary dependent upon the diameters of the driving and driven pulley structures and on the belt length. However, an intermediate value of the angle may be chosen for any single construction such that the belt is maintained in substantial alignment for all positions of the adjustable pulley structure.

In order to adjust the sliding clearance between the tongue and groove members one side of the groove 15 is formed by the adjustable member 17, which is suitably held in place by means of bolts which pass through appropriate slots formed in the member 17 and which are threaded into the sub-base.

By means of the construction provided, the movement of the supported motor and of the adjustable pulley structure is so guided that the supporting shafts of the driving and driven pulleys are maintained parallel and the belt is maintained in substantially perfect alignment.

The means provided for adjusting the position of the sliding base 10 and the supported motor and pulley structure is illustrated by Figure 2, which is a plan view of the motor supporting structure with the driving motor removed. Referring to Figure 2; the position of the sliding base 10 is adjusted by means of the lead screw 19, which threadedly engages the bushing 20 removably secured to the sliding base, and which is rotatably supported by means of the bushing 21 formed on removable cover plate 22. The axial position of the lead screw 19 is fixed by means of the shoulder 23 formed on the lead screw, and the collar 24, which is suitably secured to the lead screw and which abuts against the end of the bushing 21. The rotation of the lead screw may be suitably actuated by means of the handwheel 25, which is secured to the projecting end 26 of the lead screw. The end 26 of the lead screw may be extended to as great a distance as is desired, if it is desired to adjust the speed ratio of the adjustable speed drive from a remote location. It is obvious from the construction that the rotation of the handwheel 25 produces a corresponding adjustment of the center distance between the axes of the pulley structures. The sub-base 11 is also provided with the removable cover plate 27, which provides access to the threaded bushing 20 and the lead screw 19.

Figures 4, 4A:
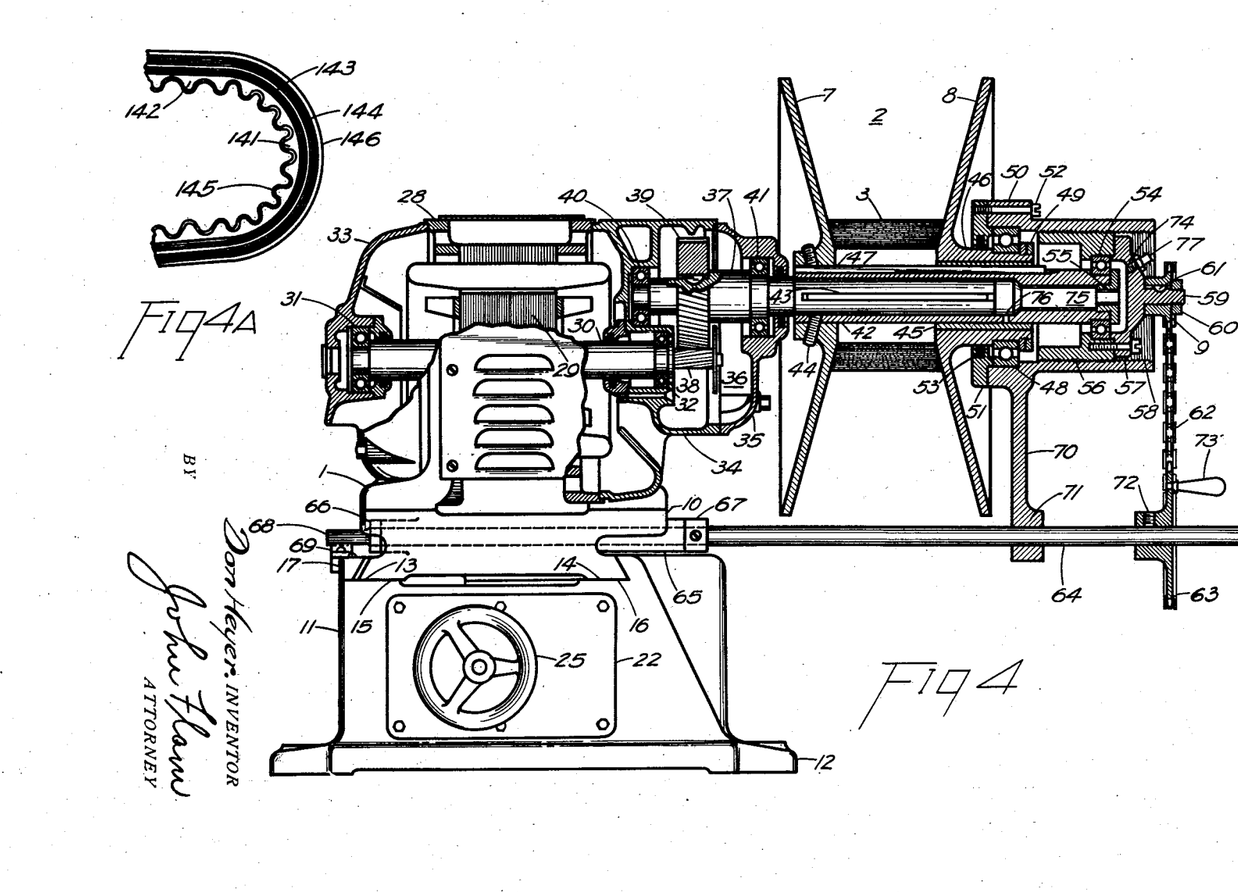
Figure 4 is a side elevation of the driving electric motor structure of the adjustable speed drive of Figure 1. This view is partly in section, taken along the axis of the adjustable pulley structure.
Figure 4A is a side elevation of the driving belt of Figure 4, and illustrates in detail a preferred form of the driving belt.

The means whereby the adjustment of the center distance produces an adjustment of the effective diameter of the adjustable pulley structure is illustrated by Figure 4. Referring to Figure 4; the geared electric motor 1 is provided with the stator 28, and the rotor 29 mounted on the motor shaft 30. The motor shaft 30 is rotatably supported by means of the bearings 31 and 32, which are respectively supported on the end brackets 33 and 34. The end bracket 33 may be of the type commonly employed in standard motor construction and may be provided with suitable air intake passages for the motor ventilation. The end bracket 34 is of special construction and together with the removable cover 35 forms the gear housing 36. The bearings 31 and 32 are supported in suitable bearing housings formed respectively in the end brackets 33 and 34.

To provide the reduction in speed between the motor shaft and the load driving shaft 37, the motor shaft has mounted thereon the driving pinion 38, which is in driving relation to the driven gear 39 mounted on the load driving shaft. The load driving shaft 37 is rotatably supported by means of the bearings 40 and 41, which are respectively supported in suitable bearing housings formed on the housing member 34 and the removable cover 35. The load driving shaft 37 projects to the exterior of the gear housing and has mounted thereon the adjustable pulley structure. The gears 38 and 39 are designed to provide the required speed at the driven machine and so that both the electric motor and the member of the adjustable speed transmission are operated at their optimum speeds.

The pulley section 7 of the adjustable pulley structure has secured thereto the axially extending hub 42 by means of which it is supported on the load driving shaft 37. The hub 42 is keyed to the load driving shaft by the key 43 and is held against axial movement by the set screw 44. The pulley section 8 is slidably supported on the exterior surface of the hub or sleeve 42 by means of the bearing bushing 45, which is suitably pressed into the hub 46 of the pulley section. The pulley section 8 is keyed to the pulley section 7 by means of the key 47, which prevents relative rotation of the pulley sections; but which permits the axial movement of the pulley section 8.

The axial adjustment of the pulley section 8 is produced by the axial adjustment of the bearing 48, which is secured to the hub 46 of the pulley section by means of the lock nuts 49. The outer race of the bearing 48 is held within the axially adjustable bearing housing 50, by means of the bearing cap 51, the bearing cap being suitably secured to the bearing housing by means of the screws 52, which pass through the bearing housing and which are threaded into the bearing cap. The bearing cap 51 is provided with a suitable lubricant retaining seal 53 for preventing the escape of lubricant along the hub 46. The hub 42 likewise has secured thereto the bearing 54, which is held to the hub by means of the bearing cap 55, which threadedly engages the interior of the hub. The outer race of the bearing 54 is held within the bearing housing formed by the threaded sleeve 56 and the bearing cap 57. The threaded sleeve 56 threadedly engages the thread 58, formed on the interior surface of the bearing housing 50.

The threaded sleeve 56 is axially fixed to the hub 42, which in turn is secured to the load driving shaft 37. It is thus obvious that a relative rotation of the threaded sleeve 56 and of the bearing housing 50 results in an axial adjustment of the bearing housing 50, the bearing 48 and of the pulley section 8. The rotation of the threaded sleeve 56 is actuated by the rotation of the sprocket wheel 9, which is secured to the stub-shaft 59, fixed to the bearing cap 57. The sprocket wheel 9 is secured to the stub-shaft 59 by the lock nut 60 and is held against relative rotation by the key 61. It is thus obvious that a rotation of the sprocket wheel 9 results in a corresponding axial adjustment of the pulley section 8 and thus produces an adjustment of the effective diameter of the adjustable pulley structure.

The sprocket wheel 9 is driven by means of the sprocket chain 62, which engages the driving sprocket 63, mounted on the rotatably supported pinion rod 64. The pinion rod 64 is rotatably supported by the bushing 65, formed on the sliding base, and is held against axial movement by the collars 66 and 67, which are suitably secured to the rod and which engages the ends of the bushing 65. The pinion rod 64 has the pinion gear 68 formed thereon, which engages the rack 69, which in turn is suitably secured to the member 17 of the sub-base. It is thus obvious from the construction that as the sliding base is adjusted with respect to the sub-base 11, to adjust the center distance; that the engagement of the rack 69 with the pinion 68 produces a rotation of the pinion rod 64, thereby producing the resultant rotation of the sprocket wheels 63 and 9.

The pinion rod 64 also serves to prevent the rotation of the bearing housing 50. For this purpose the bearing housing 50 is provided with the arm 70, which has formed thereon the bushing 71, through which the rod 64 passes. The engagement of the bushing 71 with the rod 64 prevents the rotation of the bearing housing 50, but permits the axial movement thereof.

The operation of the adjustable speed drive thus takes place in the following manner. When the center distance is adjusted by the rotation of the handwheel 25, the relative movement of the sliding base 10 and of the sub-base 11 produces a rotation of the pinion rod 64, which in turn by means of the sprocket wheels 63 and 9 and the sprocket chain 62 produces a relative rotation of threaded sleeve 56 and of the bearing housing 50, thereby producing an axial adjustment of the pulley section 8 and the resultant adjustment of the effective diameter of the adjustable pulley structure to the value required by the adjusted value of the center distance.

In order to provide means for compensating for belt wear the sprocket wheel 63 is secured to the pinion rod 64 by means of the set screw 72 and is provided with the small crank handle 73. If it is desired to increase the belt tension the set screw 72 may be withdrawn, permitting the relative rotation of the pinion rod 64 and of the sprocket wheel 63. The belt tension may then be increased, either by increasing the center distance by the rotation of the handwheel 25; or by the rotation of the sprocket wheel 63 by means of the crank handle 73, after which the sprocket wheel may again be secured to the pinion rod by means of the set screw.

To provide means whereby the belt 3 may be worn until its width is materially decreased, without impairing the efficiency of the drive, a belt is provided which is of uniform construction throughout its width. Thus as the belt wears and the belt slack is taken up by means of the sprockets 9 and 63, the nature of the driving surfaces presented by the belt to the pulley sections remains the same. There is also no tendency for parts of the belt to tear off, as the belt is worn, since the belt is of uniform construction throughout its width and has no joints formed by layers of unlike materials.

Figure 4A illustrates in detail a preferred form of the driving belt 3. The belt is formed of three main sections, the compression section, the neutral section, and the tension section. The compression section 141, that part of the belt which is compressed when the belt is bent over the pulley, is formed of a resilient rubber composition having fibrous material imbedded therein. The rubber composition is molded to form ribs or cogs 142 on the inside periphery of the belt. The cogs 142 increase the rigidity of the belt against lateral compression; but at the same time maintain the flexibility of the belt in bending around the pulley. The neutral section 143, that part of the belt which transmits most of the useful belt tension, is formed of suitable rubberized cord material extending longitudinally of the belt. The tension section 144, that part of the belt which is stretched when the belt is bent, is formed of successive layers of rubberized bias cut fabric. The inside periphery of the belt may be provided with the fabric cover 145, and the outer layer of bias cut fabric may be provided with the rubber cover 146. However, the pulley engaging sides of the belt are not covered, but the belt is made of uniform construction throughout its width.

By means of this construction a belt is provided which, due to its increased rigidity against lateral compression, is capable of transmitting an increased load, and which, by virtue of its increased flexibility, may be bent over a small diameter pulley, thereby increasing the range of the speed ratio adjustment of the adjustable speed drive.

The particular form of belt disclosed is of further utility as a plurality of the belts may be formed as a single drum, after which the drum may be cut to form the individual belts. By this means belts of various widths may be formed from a single drum, thereby obviating the necessity of providing an individual mold for each width of belt.

The sprocket wheels 9 and 63 provide means whereby the same motor supporting structure may be used with pulleys of widely different diameters and belts of various widths and lengths. The angle at which the sliding base 10 must be moved with respect to the sub-base 11 to maintain the belt in alignment is dependent upon the pulley diameters and on the belt length. Thus if it is desired to maintain the belt in alignment the guide must be formed at a different angle for each set of pulley diameters. However, a slight misalignment of the belt may be tolerated if the belt is maintained at the proper tension. Thus the same base may be used for a range of pulley diameters and the belt may be maintained at the required tension by varying the rate at which the pulley section 8 is adjusted with respect to the adjustment of the center distance. This may be accomplished by the choice of sprockets of suitable diameters for the sprockets 63 and 9.

Suitable means may be provided for supplying lubricant to the bearings 48 and 54 and to the supporting surfaces of the pulley section 8. In the present instance the bearing cap 57 is provided with the lubricating aperture 74 through which lubricant may be injected into the lubricant retaining chamber 75, formed within the hub 42. The lubricant is in turn conducted from the lubricant retaining chamber 75 to the bearings, and to the supporting surfaces of the pulley section 8 by means of the lubricant conducting aperture 76. The lubricant conducting aperture 74 may be suitably threaded to engage a pressure lubricating fixture 77. It is obvious from the construction that lubricant may be injected to the pulley structure through the lubricating fixture 77, even during the active rotation of the pulley structure.

Figures 5, 6:
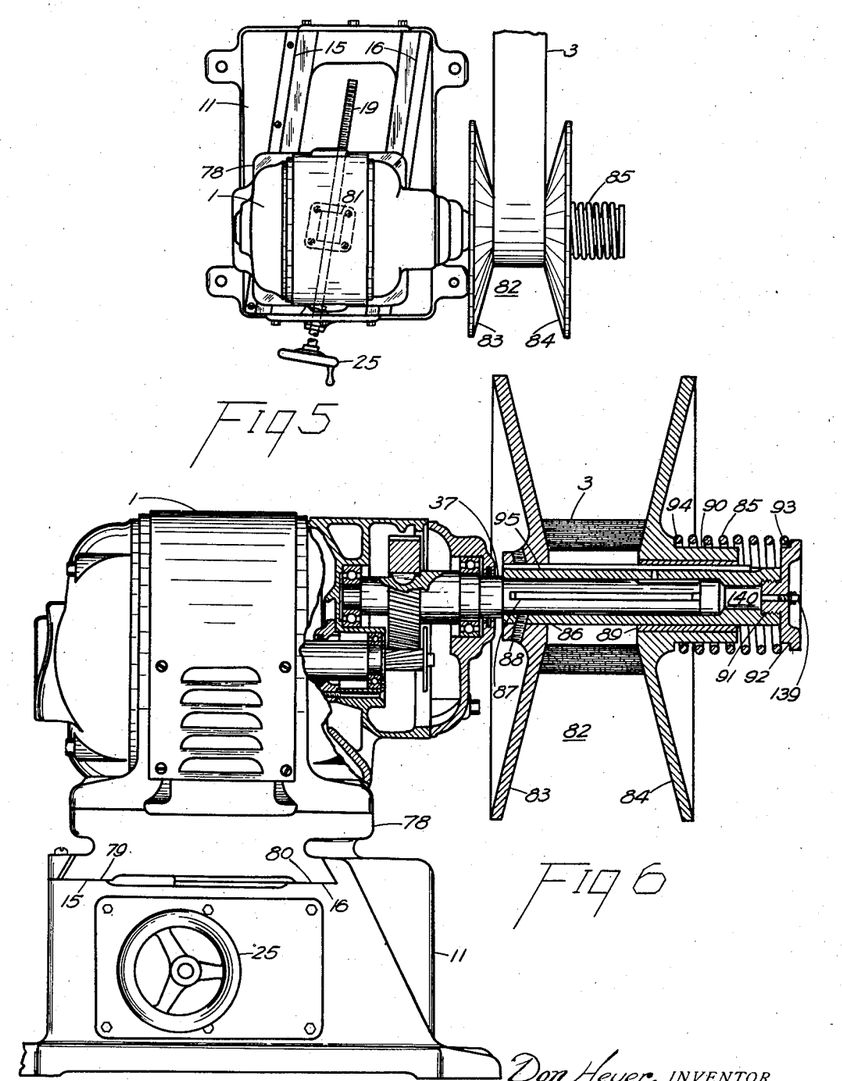
Figure 5 is a plan view of the driving motor structure of another form of the adjustable speed drive. In this form positive means are provided for adjusting the center distance and the effective diameter of the adjustable pulley structure is resiliently adjusted in accordance with the adjustment of the center distance.
Figure 6 is a side elevation of the driving motor structure of Figure 5. This view is partly in section taken along the axis of the adjustable pulley structure.

Figures 5 and 6 illustrate another form of the adjustable speed drive. In this form the geared electric motor 1 is supported on the sliding motor base 78, which may be of the same form as the sliding base 10 of Figures 1 to 4, except that, the structure associated with the rotatably supported pinion rod 64 is omitted. The sliding base 78 is supported on the sub-base 11 and is guided in its movement with respect to the sub-base by means of the engagement of the tongue members 79 and 80 with the grooves 15 and 16 formed on the sub-base. The sliding base 78 has removably secured thereto the threaded bushing 81 which engages the lead screw 19. As in the construction of Figures 1 to 4, the rotation of the handwheel 25 results in a corresponding adjustment of the sliding base 78 and of the supported motor 1.

The geared electric motor 1 is in driving relation to the adjustable pulley structure 82. The pulley structure 82 is formed by the pulley sections 83 and 84, the pulley section 83 being axially fixed with respect to the load driving shaft of the geared electric motor and the pulley section 84 being urged toward the pulley section 83 by means of the spring 85. The pulley structure 82 is in driving relation to the belt 3, which as in the construction of Figures 1 to 4 may be in driving relation to a driven pulley mounted on the driving shaft of a driven machine. In this form the center distance between the driving and driven pulleys is positively adjusted by means of the handwheel 25 and the lead screw 19 and the diameter of the adjustable pulley structure 82 is resiliently adjusted by means of the spring 85 to the value required by the adjusted center distance. As in the construction of Figure 1, the grooves 15 and 16, formed on the sub-base, serve to maintain the belt in alignment. For as the sliding base 78 is adjusted to decrease the center distance the sliding base 78, the supported motor and the pulley section 83 are moved toward the right to maintain the belt in alignment.

The construction of the adjustable pulley structure 82 is illustrated in detail by Figure 6; which is a view of the driving motor and pulley structure of Figure 5, as viewed from the front of Figure 5. Referring to Figure 6; the pulley section 83 is supported on the load driving shaft 37 by means of the axially extending hub 86. The hub or sleeve 86 is suitably keyed to the load driving shaft by the key 87 and is held against axial movement by the set screw 88. The pulley section 84 is supported on the exterior surface of the hub 86 by means of the bearing bushing 89, which is pressed into the hub 90 of the pulley section. The hub 86 is provided with the threaded end 91 into which the cap 92 is threaded. The threaded cap 92 is provided with the shoulder 93, which engages one end of the helical compression spring 85, and the other end of the helical spring 85 engages the shoulder 94, formed on the reverse side of the pulley section 84. The compression spring 85 thus serves to urge the pulley sections 83 and 84 into driving relation with the belt 3. The pulley section 84 may be suitably keyed to the pulley section 83 by means of the key 95, which prevents the relative rotation of the pulley sections, but which permits the axial movement of the pulley section 84.

The supporting surfaces of the pulley section 84 may be suitably lubricated by means of lubricant injected into the lubricant retaining chamber 140 through the pressure lubricating fixture 139.

Figure 7:
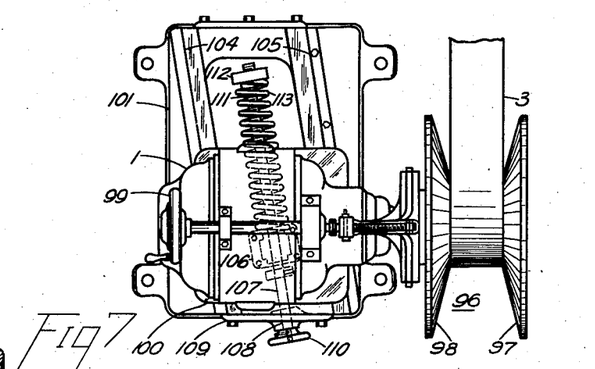
Figure 7 is a plan view of a form of the adjustable speed drive, in which positive means are provided for adjusting the diameter of the adjustable pulley structure, and in which the center distance is resiliently adjusted in accordance with the adjustment of the effective pulley diameter.
Figure 8:
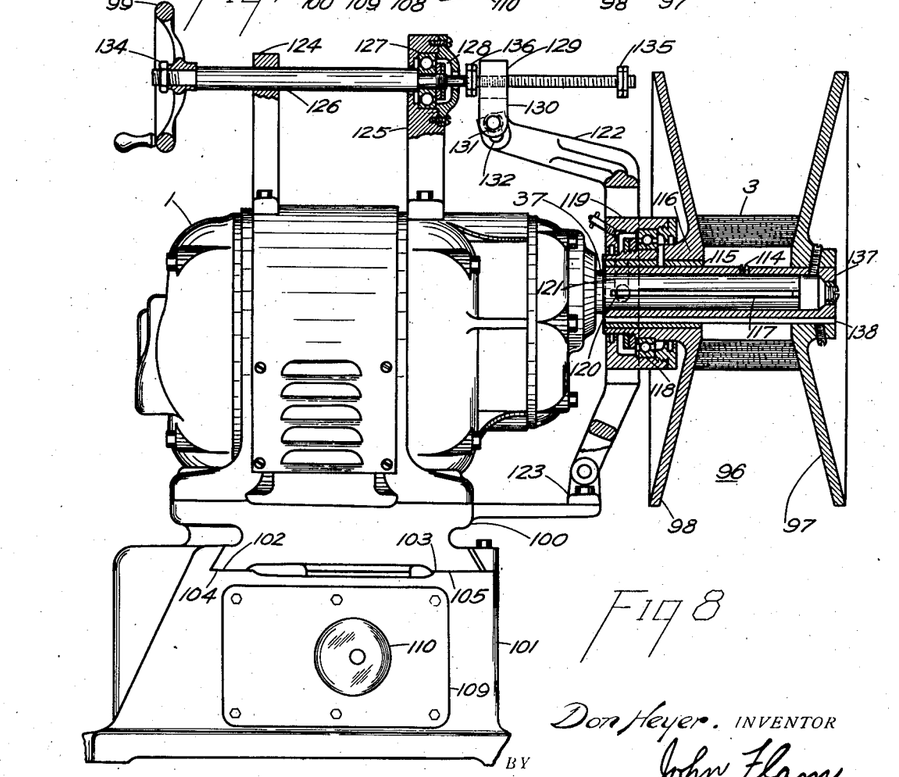
Figure 8 is a side elevation of the driving motor structure of Figure 7. This view is partly in section taken along the axis of the adjustable pulley structure.

A third form of the adjustable speed drive is illustrated by Figures 7 and 8. In this form positive means are provided for adjusting the effective diameter of the adjustable pulley structure, and the center distance between the driving and driven pulley structures is resiliently adjusted in accordance with the adjustment of the effective pulley diameter. Referring to Figure 7; the geared electric motor 1 is in driving relation to the adjustable pulley structure 96. The adjustable pulley structure 96 has the pulley section 97, which is axially fixed to the load driving shaft of the geared electric motor, and the pulley section 98, which is axially adjustable with respect to the fixed pulley section. The pulley sections 97 and 98 are in driving relation to the belt 3, which as in the construction of Figure 1 may be in driving relation to a driven pulley structure mounted on the driving shaft of a driven machine. The effective diameter of the adjustable pulley structure is positively adjusted by moving the pulley section 98 toward, or away from, the pulley section 97, this adjustment being actuated by the rotation of the handwheel 99. The means whereby the rotation of the handwheel 99 produces an axial adjustment of the pulley section 98 will be described in detail in connection with Figure 8.

The driving geared electric motor is mounted on the sliding motor base 100, which in turn is guided by and supported on the sub-base 101. The movement of the sliding base 100 is guided by the engagement of the tongue members 102 and 103, formed on the sliding base, with the grooves 104 and 105, formed on the sub-base. The pulley section 97 being axially fixed with respect to the frame of the geared electric motor, it is necessary that the pulley section 97 and the geared motor be moved toward the left, as viewed in Figure 7, when the center distance is decreased, if the belt is to be maintained in alignment. The required movement of the sliding motor base 100 and of the supported motor and pulley structure is provided by arranging the grooves 104 and 105 in the manner as illustrated in Figure 7.

To provide the adjustment of the center distance, the sliding base 100 has removably secured thereto the pedestal 106, through which the threaded rod 107 projects. One end of the rod 107 is supported in the bearing bushing 108, formed on the removable cover plate 109. The rod projects through the cover plate and has secured to the end thereof the small handwheel 110. The other end of the rod 107 is provided with the threaded portion 111, which threadedly engages the collar 112. The collar 112 serves as a support for one end of the helical compression spring 113, the other end of which abuts against the pedestal 106 secured to the sliding base. It is seen that the spring 113 constantly urges the sliding base and the supported motor and pulley structure in a center distance increasing direction, thereby adjusting the center distance between the driving and driven pulley structures in accordance with the adjustment of the adjustable pulley structure.

The handwheel 110 provides means for adjusting the belt tension of the adjustable speed drive. It is obvious from the construction that the threaded collar 112 can be moved along the threaded rods 107, to increase or decrease the spring pressure exerted by the spring 113, by the rotation of the handwheel 110. The rotation of the handwheel thus serves to adjust the force urging the supported pulley structure in a center distance increasing direction and thereby adjusts the belt tension.

The construction of the adjustable pulley structure is illustrated by Figure 8, which is a view of the driving motor structure taken from the front of Figure 7. Referring to Figure 8; the pulley section 97 is supported on the load driving shaft 37 by means of the sleeve 137 and is axially fixed to the shaft by the set screw 114. The pulley section 98 is supported on the sleeve 137 by means of the bearing bushing 115, which is pressed into the hub 116 of the pulley section. The sleeve 137 may be suitably keyed to the motor shaft by means of the key 117, and the pulley sections may be keyed to the sleeve 137 by the key 138.

To provide means for adjusting the effective diameter of the adjustable pulley structure, the pulley section 98 has secured to the hub thereof the bearing 118, the inner race of which is fixed to the pulley hub 116 and the outer race of which is held within the axially adjustable bearing housing 119. The bearing housing 119 has secured thereto the oppositely placed, radially projecting pins 120, which engage the slots 121 formed in the shift lever 122. The shift lever 122 encircles the bearing housing 119 and thus provides means whereby the bearing housing and the bearing 118 may be urged in an axial direction without tilting the bearing housing. The shift arm is illustrated in Figure 8 with one part broken away in order to show the interior of the bearing housing. The shift arm 122 is pivotally supported on the pedestal 123, which in turn is supported by the sliding motor base 100. It is obvious from the construction that a pivotal movement of the shift arm, about the pivot formed by the pedestal 123, results in a corresponding axial adjustment of the pulley section 98 and thereby produces an adjustment of the effective diameter of the adjustable pulley structure.

To provide means for adjusting the angular position of the shift arm, the geared motor frame has supported thereon the bearing pedestals 124 and 125, which provide means for rotatably supporting the threaded rod 126. The threaded rod 126 is rotatably supported on the bearing pedestal 125 by means of the bearing 127, which has an inner race suitably secured to the threaded rod and an outer race which is held within the bearing housing 128 formed in the bearing pedestal 125. The threaded rod 126 engages the threaded sleeve 129, which has formed thereon the clevis 130. The clevis 130 supports the pin 131, which engages the slotted end 132 of the shift arm 132. The engagement of the clevis 130 and the pin 131 with the shift arm prevents the rotation of the threaded sleeve 129. It is thus obvious that a rotation of the rod 126 results in a corresponding axial movement of the threaded sleeve 129 and of the pin 131 and in the resultant pivotal movement of the shift arm 122.

Suitable means may be provided for actuating the rotation of the rod 126. In the present instance the handwheel 99 is provided, which is suitably secured to the rod by the locknut 134.

In order to limit the adjustment of the effective diameter of the adjustable pulley structure, the lock nuts 135 and 136 may be secured to the threaded rod 126, on either side of the threaded sleeve 129. The lock nuts may be so positioned on the threaded rod, that when the diameter of the driving pulley structure has been adjusted to its limiting maximum diameter the lock nuts 135 come into contact with the end of the threaded sleeve 129, thereby preventing any further increasing adjustment of the pulley diameter; and the lock nuts 136 are so positioned on the rod that when the effective diameter of the adjustable pulley structure has been adjusted to its limiting minimum diameter, the end of the sleeve 129 comes into contact with the lock nuts 136, thereby preventing a further decrease of the effective diameter of the pulley structure.

In each of the forms described it is obvious from the construction that the driving adjustable diameter pulley structure may be directly supported by the load driving shaft of the geared electric motor and that the driven pulley structure may be directly mounted on the driving shaft of the driven machine. It is to be further noted that the gears of the geared electric motor may be chosen of such ratio, that the driving belt is operated at its optimum speed over the most advantageous pulley diameters, and it is also to be noted that by means of the construction provided the same driving belt and driven pulley may be used in drives having widely varying speed requirements.

I claim:

1. In a variable speed power unit for driving a load, an electric motor, a driving pulley structure adapted to be used with a driven pulley structure and having a pair of pulley sections with opposed inclined faces, forming by relative axial adjustment, variable effective pulley diameters, a shaft upon which said sections are supported, gearing between said shaft and the motor, a driven pulley structure, a base for the motor upon which the motor is mounted for movement in a direction transverse to the axis of the motor, for varying the center distance between the driving and driven pulley structures, and adjusting means for varying the effective pulley diameter, and rack and pinion mechanism for actuating said adjustment means in response to said movement of the motor with respect to the base.

2. In a variable speed power unit for driving a load, an electric motor, a driving pulley structure having a pair of pulley sections with opposed inclined faces, forming by relative axial adjustment, variable effective pulley diameters, a shaft upon which said sections are supported, gearing between said shaft and the motor, one of said sections being fixed to the shaft, and the other of said sections being axially adjustable on said shaft, a driven pulley structure, a base for the motor upon which the motor is mounted for movement to vary the center distance between the driving and driven pulley structures, as well as to maintain the pulley structures in substantial alinement, and means for positively moving said axially adjustable pulley section for varying the effective diameter of the driving pulley structure, and rack and pinion mechanism for actuating said adjustment means in response to said movement of the motor with respect to the base.

3. In a variable speed mechanism, a variable diameter pulley structure having a pair of sections with opposed inclined faces, forming by relative axial adjustment, variable pulley diameters, a shaft upon which the sections are supported, an axially adjustable non-rotary support for one of said sections, means connecting said support and said section, said shaft having a hollow extension passing into said support, a thrust bearing between said support and one of said pulley sections, said pulley section being thus capable of sliding adjustment over the hollow extension, and means for axially moving said support, comprising an angularly adjustable member encompassing the end of the hollow extension, and a bearing structure between said member and the shaft, said member forming with the hollow extension and the support, a lubricant chamber in communication with the bearings and the sliding surfaces, said member having an opening through which lubricant can be passed into the chamber during rotation of the shaft.

4. In a variable speed mechanism, a driving pulley structure having a pair of pulley sections with opposed inclined faces, forming by relative axial adjustment, variable effective pulley diameters, a driving shaft upon which said sections are supported, means for moving the shaft in a direction transverse to its axis, rotatable means for altering the relative positions of said pair of pulley sections, a wheel, a mounting for the wheel to provide for it an axis parallel to the shaft and in fixed relation to the axis of the shaft, a flexible driving element connecting said wheel and said rotatable means whereby rotation of the wheel is effective to adjust the relative axial positions of the pulley sections, and means whereby said transverse motion of the driving shaft causes said wheel to be rotated.

5. In a variable speed mechanism, a driving pulley structure having a pair of pulley sections with opposed inclined faces, forming by relative axial adjustment, variable effective pulley diameters, a driving shaft upon which said sections are supported, means for moving the shaft in a direction transverse to its axis, rotatable means for altering the relative positions of said pair of pulley sections, a wheel, a mounting for the wheel to provide for it an axis parallel to the shaft and in fixed relation to the axis of the shaft, a flexible driving element connecting said wheel and said rotatable means whereby rotation of the wheel is effective to adjust the relative axial positions of the pulley sections, and means, including a pinion shaft upon which said wheel is mounted, whereby said transverse motion of the driving shaft causes said wheel to be rotated, said wheel being capable of independent angular adjustment on said shaft to operate supplementarily said flexible driving element for adjusting belt tension.

6. In a variable speed power unit having a motor and a shaft, a driving pulley structure supported on said shaft and adapted to be used with a driven pulley structure, a belt connecting said pulley structures, said driving pulley structure having a pair of pulley sections with opposed inclined faces, forming by relative axial adjustment variable effective pulley diameters, one of said sections being fixed to the shaft and the other section being axially slidable thereon, a thrust bearing axially fixed to said slidable section, a supporting cup for said thrust bearing, threaded means for varying the axial position of said cup, a base upon which the motor is mounted for movement to vary the center distance between said pulley structures as well as to maintain said structures in substantial alinement, means to vary said center distance, and means to cause substantially simultaneous positive actuation of said last mentioned means and said threaded means.

DON HEYER.